United States Patent
Al Moaikel et al.

(10) Patent No.: US 11,788,934 B2
(45) Date of Patent: Oct. 17, 2023

(54) IN-LINE FLUID AND SOLID SAMPLING WITHIN FLOWLINES

(71) Applicant: Saudi Arabian Oil Company, Dhahran (SA)

(72) Inventors: Rami Al Moaikel, Dhahran (SA); Pablo Daniel Genta, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 476 days.

(21) Appl. No.: 16/918,256

(22) Filed: Jul. 1, 2020

(65) Prior Publication Data

US 2022/0003638 A1 Jan. 6, 2022

(51) Int. Cl.
| | |
|---|---|
| G01N 1/20 | (2006.01) |
| G01N 1/08 | (2006.01) |
| F16L 55/40 | (2006.01) |
| F16L 55/48 | (2006.01) |
| F16L 101/30 | (2006.01) |

(52) U.S. Cl.
CPC ............ G01N 1/2035 (2013.01); F16L 55/40 (2013.01); F16L 55/48 (2013.01); G01N 1/08 (2013.01); F16L 2101/30 (2013.01)

(58) Field of Classification Search
None
See application file for complete search history.

(56) References Cited

U.S. PATENT DOCUMENTS

| | | |
|---|---|---|
| 2,493,504 A | 1/1950 | Roberts |
| 2,826,077 A | 3/1958 | Walker |
| 3,265,083 A | 8/1966 | Sachnik |
| 3,284,702 A | 11/1966 | Ownby |
| 3,460,028 A | 8/1969 | Beaver et al. |

(Continued)

FOREIGN PATENT DOCUMENTS

| | | | | |
|---|---|---|---|---|
| CA | 1286772 C | * | 7/1991 | ........... E21B 47/022 |
| CA | 2218029 A | * | 4/1999 | ............. G01B 21/08 |

(Continued)

OTHER PUBLICATIONS crp.co.uk [online], "Inline Sampling," retrieved from URL <http://www.crp.co.uk/sampling.aspx?page=17>, available on or before Jun. 2008, retrieved on Mar. 12, 2020, 2 pages.

(Continued)

*Primary Examiner* — Daniel S Larkin
(74) *Attorney, Agent, or Firm* — Fish & Richardson P.C.

(57) ABSTRACT

An apparatus includes a body and a fluid sampling conduit disposed within the body. The body is configured to be disposed within a pipe flowing a fluid. The fluid sampling conduit is configured to obtain a sample of the fluid flowing in the pipe. The apparatus includes an odometer wheel coupled to the body and an elastomeric ring surrounding at least a portion of the body. The elastomeric ring is configured to remove material disposed on an inner wall of the pipe as the apparatus travels through the pipe. The apparatus includes a solid sampling subsystem coupled to an external to the body. The solid sampling subsystem includes a capsule, an inlet valve, and a tubing. The inlet valve, when opened, allows at least a portion of the material removed from an inner wall of the pipe to flow through the tubing and into the capsule.

19 Claims, 10 Drawing Sheets

(56) References Cited

U.S. PATENT DOCUMENTS

| | | | |
|---|---|---|---|
| 3,539,915 A | 11/1970 | Walters et al. | |
| 4,209,029 A | 6/1980 | Pennington | |
| 4,391,152 A | 7/1983 | Ellett | |
| 4,435,872 A | 3/1984 | Leikam | |
| 4,562,749 A | 1/1986 | Clark | |
| 4,625,571 A | 12/1986 | Slater | |
| 4,891,115 A | 1/1990 | Shishkin et al. | |
| 4,906,136 A | 3/1990 | Norbom et al. | |
| 4,945,775 A * | 8/1990 | Adams | F16L 55/26 |
| | | | 73/865.8 |
| 4,976,144 A | 12/1990 | Fitzgerald | |
| 5,044,827 A | 9/1991 | Gray | |
| 5,139,576 A | 8/1992 | Davis | |
| 5,186,757 A | 2/1993 | Abney, Sr. | |
| 5,197,328 A | 3/1993 | Fitzgerald | |
| 5,203,646 A | 4/1993 | Landsberger et al. | |
| 5,272,647 A | 12/1993 | Hayes | |
| 5,329,465 A | 7/1994 | Arcella et al. | |
| 5,406,855 A | 4/1995 | Welker | |
| 5,413,002 A | 5/1995 | Jiskoot et al. | |
| 5,430,643 A | 7/1995 | Seraji | |
| 5,549,137 A | 8/1996 | Lenz et al. | |
| 5,565,633 A * | 10/1996 | Wernicke | G01N 27/82 |
| | | | 73/865.8 |
| 5,748,469 A | 5/1998 | Pyotsia | |
| 5,763,794 A | 6/1998 | Marrelli | |
| 5,769,955 A | 6/1998 | Kozisek | |
| 6,131,609 A | 10/2000 | Metso et al. | |
| 6,234,717 B1 | 5/2001 | Corbetta | |
| 6,243,657 B1 * | 6/2001 | Tuck | G01C 21/165 |
| | | | 324/207.13 |
| 6,289,752 B1 | 9/2001 | Nimberger et al. | |
| 6,475,294 B2 | 11/2002 | McCanna et al. | |
| 6,880,195 B1 | 4/2005 | Bahari et al. | |
| 6,917,176 B2 | 7/2005 | Schempf et al. | |
| 7,210,364 B2 | 5/2007 | Ghorbel et al. | |
| 7,617,558 B2 | 11/2009 | Boe | |
| 7,940,189 B2 | 5/2011 | Brown | |
| 8,015,695 B2 | 9/2011 | Polivka et al. | |
| 8,237,920 B2 | 8/2012 | Jones et al. | |
| 8,397,670 B2 | 3/2013 | Van Den Berg | |
| 8,768,631 B2 | 7/2014 | Wilke | |
| 8,800,584 B2 | 8/2014 | McNabney et al. | |
| 8,805,579 B2 | 8/2014 | Skrinde | |
| 8,838,413 B2 | 9/2014 | Genta | |
| 8,850,880 B2 | 10/2014 | Püttmer | |
| 10,317,718 B2 | 6/2019 | Ihalainen et al. | |
| 10,344,782 B2 | 7/2019 | Penning et al. | |
| 10,429,427 B2 | 10/2019 | Fink et al. | |
| 10,955,082 B2 | 3/2021 | Genta | |
| 11,371,319 B2 | 6/2022 | Al Mulhem et al. | |
| 11,604,169 B2 | 3/2023 | Du | |
| 2003/0037830 A1 | 2/2003 | Lee | |
| 2003/0154769 A1 | 8/2003 | Tucker et al. | |
| 2004/0074030 A1 | 4/2004 | Nehrbass | |
| 2004/0158355 A1 | 8/2004 | Holmqvist et al. | |
| 2007/0177944 A1 | 8/2007 | Smith et al. | |
| 2007/0214590 A1 | 9/2007 | Boe | |
| 2008/0072963 A1 | 3/2008 | Strohmeier et al. | |
| 2009/0152520 A1 | 6/2009 | Hepburn | |
| 2010/0104401 A1 | 4/2010 | Hopkins et al. | |
| 2010/0305875 A1 | 12/2010 | Williams et al. | |
| 2011/0106362 A1 | 5/2011 | Seitz | |
| 2011/0114119 A1 | 5/2011 | Yang et al. | |
| 2012/0193154 A1 | 8/2012 | Wellborn et al. | |
| 2013/0110418 A1 | 5/2013 | Nousiainen | |
| 2016/0169436 A1 | 6/2016 | Sander et al. | |
| 2016/0340161 A1 | 11/2016 | Olivier | |
| 2016/0369934 A1 | 12/2016 | Penza et al. | |
| 2018/0356314 A1 | 12/2018 | Lagus | |
| 2020/0130030 A1 | 4/2020 | Punpruk et al. | |
| 2022/0345006 A1 | 10/2022 | Soliman | |
| 2023/0158900 A1 | 5/2023 | Genta et al. | |

FOREIGN PATENT DOCUMENTS

| | | | | |
|---|---|---|---|---|
| CA | 2520332 C * | 7/2008 | | F16L 55/28 |
| EP | 0315391 | 4/1994 | | |
| GB | 2540583 A * | 1/2017 | | F16L 55/28 |
| WO | WO 2010036932 | 4/2010 | | |
| WO | WO 2010072403 | 7/2010 | | |
| WO | WO 2015020986 | 2/2015 | | |
| WO | WO 2015134482 | 9/2015 | | |
| WO | WO 2015153106 | 10/2015 | | |

OTHER PUBLICATIONS dopak.com [online], "Sampling Systems: In Line Liquid Samplers (DPT Series)," retrieved from URL <https://www.dopak.com/products/product-overview/sampling-systems/closed-sampling/liquid-samplers/in-line-liquid-samplers-dpt-series.html>, available on or before Feb. 2020, retrieved on Mar. 12, 2020, 2 pages.

intertek.com [online], "Petroleum Pipeline Services," retrieved from URL <https://www.intertek.com/petroleum/testing/pipeline/>, available on or before Apr. 2019, retrieved on Mar. 12, 2020, 5 pages.

online-electronics.com [online], "MEG ARTS," retrieved from URL <https://www.online-electronics.com/our-products/datalogging-testing/meg-arts>, available on or before 2018, retrieved on Mar. 12, 2020, 3 pages.

sensiaglobal.com [online], "In-Line Sampling System," retrieved from URL <https://www.sensiaglobal.com/Measurement/Types/Sampling/Sampling-Systems/In-Line-Sampling-System>, available on or before 2020, retrieved on Mar. 12, 2020, 4 pages.

wateronline.com [online], "A Laboratory in a Pipeline Pig," retrieved from URL <https://www.wateronline.com/doc/a-laboratory-in-a-pipeline-pig-0001>, published Aug. 12, 2011, retrieved on Mar. 12, 2020, 2 pages.

PCT International Search Report and Written Opinion in International Appln. No. PCT/US2021/039542, dated Oct. 20, 2021, 15 pages.

* cited by examiner

IN-LINE FLUID AND SOLID SAMPLING WITHIN FLOWLINES

TECHNICAL FIELD

This disclosure relates to sampling within a conduit, for example, a flowline flowing one or more hydrocarbons.

BACKGROUND

In quality assurance, fluid sampling is a selection of a fluid sample to estimate representative characteristics of the bulk fluid. In some cases, multiple samples are taken to obtain a more accurate understanding of the bulk fluid. Once the samples are obtained, one or more properties are determined. As one specific example, sampling of hydrocarbon fluids in pipelines is normally required in order to comply with hydrocarbon transportation regulations in various countries. In some cases, sampling is required to meet contractual obligations amongst, for example, the transporting party, the hydrocarbon supplier, and the consumer.

SUMMARY

This disclosure describes technologies relating to sampling within a conduit, for example, fluid and solid sampling within a flowline flowing one or more hydrocarbons. Certain aspects of the subject matter described can be implemented as an apparatus. The apparatus includes a body configured to be disposed within a pipe flowing a fluid. The apparatus includes a fluid sampling conduit disposed within the body. The fluid sampling conduit is configured to obtain a sample of the fluid flowing in the pipe. The apparatus includes an odometer wheel coupled to the body. The odometer wheel is configured to measure a distance traveled by the apparatus within the pipe based on rotating while contacting an inner wall of the pipe as the apparatus travels through the pipe. The apparatus includes an elastomeric ring surrounding at least a portion of the body. The elastomeric ring is configured to contact the inner wall of the pipe and remove material disposed on the inner wall of the pipe as the apparatus travels through the pipe. The apparatus includes a solid sampling subsystem coupled to and external to the body. The solid sampling subsystem includes a capsule, an inlet valve coupled to the capsule, and a tubing coupled to the inlet valve. When opened, the inlet valve is configured to allow at least a portion of material removed from the inner wall of the pipe by the elastomeric ring to flow through the tubing and into the capsule.

This, and other aspects, can include one or more of the following features.

The body can include a first plate, a second plate, and a cylindrical housing extending from the first plate to the second plate. The fluid sampling conduit can be disposed within the cylindrical housing. The fluid sampling conduit can extend from the first plate to the second plate. The fluid sampling conduit can include a first open end at the first plate and a second open end at the second plate. The odometer wheel can be coupled to an arm at a coupling point on the arm. The arm can be coupled to and extend from the body. The odometer wheel can be configured to rotate about the coupling point.

The solid sampling subsystem can include a housing coupled to the first plate. The capsule can be disposed within the housing. The solid sampling subsystem can include an outlet valve coupled to the capsule. The outlet valve can be configured to control flow of material out of the capsule.

The arm can include a first segment and a second segment connected to each other by a joint configured to allow rotation of the second segment about the joint in relation to the first segment. The first segment can be coupled to the first plate.

The elastomeric ring can be a first elastomeric ring surrounding a first portion of the cylindrical housing. The apparatus can include a second elastomeric ring surrounding a second portion of the cylindrical housing.

The apparatus can include an inertial sensor. The inertial sensor can include at least one of a gyroscope sensor, an inclinometer, or an x-y-z accelerometer.

The fluid sampling conduit can be a first fluid sampling conduit. The apparatus can include a second fluid sampling conduit disposed within the cylindrical housing. The second fluid sampling conduit can extend from the first plate to the second plate. The second fluid sampling conduit can include a first open end at the first plate and a second open end at the second plate. The apparatus can include a third valve disposed at a first location along the second fluid sampling conduit between the first open end of the second fluid sampling conduit and the second open end of the second fluid sampling conduit.

The odometer wheel can be a first odometer wheel. The arm can be a first arm. The coupling point can be a first coupling point. The apparatus can include a second odometer wheel coupled to a second arm at a second coupling point. The second arm can extend from the first plate. The second odometer wheel can be configured to rotate freely at the second coupling point with respect to the second arm. The second arm can include a first segment and a second segment connected to each other by a joint configured to allow rotation of the second segment of the second arm about the joint of the second arm in relation to the first segment of the second arm. The first segment of the second arm can be coupled to the first plate.

The capsule can be a first capsule. The outlet valve can be a first outlet valve. The inlet valve can be a first inlet valve. The tubing can be a first tubing. The apparatus can include a second capsule disposed within the housing. The second capsule can have an internal pressure less than atmospheric pressure. The apparatus can include a second outlet valve coupled to the second capsule. The second outlet valve can be configured to control flow of material out of the second capsule. The apparatus can include a second inlet valve coupled to the second capsule. The second inlet valve can be configured to control flow of material into the second capsule. The apparatus can include a second tubing disposed along the second arm. At least one end of the second tubing can be coupled to the second inlet valve.

Certain aspects of the subject matter described can be implemented as a system. The system includes a pipe configured to flow a fluid. The system includes an apparatus configured to be disposed within the pipe. The apparatus includes a body, multiple fluid sampling conduits disposed within the body, multiple odometer subsystems, an elastomeric ring surrounding at least a portion of the body, and multiple solid sampling subsystems coupled to and external to the body. Each fluid sampling conduit is configured to obtain a sample of the fluid flowing within the pipe. Each odometer subsystem includes an arm extending from the body and an odometer wheel coupled to the arm at a coupling point. Each odometer wheel is configured to rotate freely at the respective coupling point with respect to the respective arm. Each odometer wheel is configured to contact an inner wall of the pipe. Each odometer wheel is configured to, while contacting the inner wall of the pipe and rotating about the respective coupling point as the apparatus travels through the pipe, measure a distance traveled by the apparatus within the pipe. The elastomeric ring is configured to contact the inner wall of the pipe and remove material disposed on the inner wall of the pipe as the apparatus travels through the pipe. Each solid sampling subsystem includes a capsule, an inlet valve coupled to the capsule, and a tubing coupled to the inlet valve. Each inlet valve is configured to, when opened, allow at least a portion of material removed from the inner wall of the pipe by the elastomeric ring to flow through the tubing and into the capsule. Each tubing is disposed along a different one of the arms of the odometer subsystems.

This, and other aspects, can include one or more of the following features.

The body can include a first plate, a second plate, and a cylindrical housing extending from the first plate to the second plate. The fluid sampling conduits can be disposed within the cylindrical housing. Each fluid sampling conduit can extend from the first plate to the second plate. Each fluid sampling conduit can include a first open end at the first plate and a second open end at the second plate.

The system can include a housing external to the body and coupled to the first plate. Each capsule of the solid sampling subsystems can be disposed within the housing. Each solid sampling subsystem can include an outlet valve coupled to the respective capsule. Each outlet valve can be configured to control flow of material out of the respective capsule.

Each arm of the odometer subsystems can include a first segment and a second segment connected to each other by a joint configured to allow rotation of the second segment about the joint in relation to the first segment. Each first segment can be coupled to the first plate. The elastomeric ring can be a first elastomeric ring surrounding a first portion of the cylindrical housing. The apparatus can include a second elastomeric ring surrounding a second portion of the cylindrical housing.

The apparatus can include an inertial sensor. The inertial sensor can include at least one of a gyroscope sensor, an inclinometer, or an x-y-z accelerometer.

The apparatus can include a computer disposed within the cylindrical housing. The computer can be communicatively coupled to each odometer subsystem, each fluid sampling subsystem, each solid sampling subsystem, and the inertial sensor. The computer can include a processor and a computer-readable medium interoperably coupled to the processor. The medium can store instructions executable by the processor to perform operations. The operations can include receiving distance data from at least one of the odometer subsystems. The operations can include receiving inertia data from the inertial sensor. The operations can includes transmitting a first open signal to at least one of the fluid sampling subsystems, thereby allowing fluid flowing in the pipe to flow into the respective fluid sampling subsystem. The operations can include a first close signal to the fluid sampling system to which the first open signal was transmitted, thereby ceasing fluid flow from the pipe to the respective fluid sampling subsystem and storing a portion of the fluid flow from the pipe within the respective fluid sampling subsystem. The operations can include transmitting a second open signal to the inlet valve of at least one of the solid sampling subsystems, thereby allowing at least a portion of material removed from the inner wall of the pipe by the elastomeric ring to flow through the respective tubing and into the respective capsule. The operations can include transmitting a second close signal to the inlet valve to which the second open signal was transmitted, thereby ceasing flow of material from the pipe to the respective capsule and storing the portion of material within the respective capsule. The operations can include determining a location of the apparatus within the pipe based on the received distance data and the received inertia data.

Certain aspects of the subject matter described can be implemented as a method. A distance traveled by an apparatus within a pipe is measured by an odometer of the apparatus. A sample of fluid flowing in the pipe is obtained and stored by a fluid sampling conduit of the apparatus. Material disposed on an inner wall of the pipe is removed by an elastomeric ring of the apparatus. At least a portion of the material removed from the inner wall of the pipe is obtained and stored by a capsule of the apparatus.

This, and other aspects, can include one or more of the following features.

Obtaining the sample of fluid can occur at a first location along the pipe, and measuring the distance traveled by the apparatus within the pipe can be repeated at the first location.

Obtaining the portion of the material removed from the inner wall of the pipe can occur at a second location along the pipe, and measuring the distance traveled by the apparatus within the pipe can be repeated at the second location.

A change in inertia of the apparatus within the pipe can be measured by an inertial sensor of the apparatus. A location of the apparatus within the pipe can be determined based on the measured distance and the measured change in inertia.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes fluid and solid sampling within a flowline, for example, a pipe carrying one or more hydrocarbons. An in-line sampling apparatus can be used within a pipe to obtain various measurements (for example, pressure and location), collect fluid samples, and collect solid samples (for example, debris, corrosion deposits, or both). The entirety of the sampling apparatus can be disposed inside the pipe. The sampling apparatus can carry out such operations at desired, different radial and axial locations within the pipe. Internal corrosion in pipes can vary in magnitude both along the longitudinal length of the pipe (axial basis) and also along the circumference of the pipe (radial basis). Furthermore, the locations of corrosion deposit can be distributed non-uniformly on an axial basis, a radial basis, or both. The sampling apparatus can take samples of the fluid flowing within the pipe and of corrosion deposits (organic, inorganic, or both) on the pipe wall at specific locations and radial orientations in order to determine where corrosion is occurring in the pipe. In some cases, corrosion can be indicative of the presence of water. The fluid samples obtained by the sampling apparatus can be analyzed to determine the composition of the water and identify corrosive species, including organic and inorganic corrosive species. Further, various tasks (such as obtaining samples, injecting treatment fluids, and removing corrosion or debris by abrasion) can be performed at desired locations along the longitudinal length of the pipe.

The subject matter described in this disclosure can be implemented in particular implementations, so as to realize one or more of the following advantages. The locations at which the operations are carried out can be determined and recorded by the sampling apparatus. That is, the sampling apparatus is capable of recognizing its relative location within the pipe as it carries out one or more of the operations (such as obtaining a fluid sample or a solid sample). Multiple samples (fluid, solid, or both) can be obtained and stored within the same apparatus. The samples can be obtained at various axial locations along the longitudinal length of the pipe. The samples can be obtained at various radial locations with respect to the cross-sectional area of the pipe.

Figure 1:
FIG. 1 is a schematic diagram of an example sampling apparatus disposed within a pipe.

FIG. 1 is a schematic diagram of an example sampling apparatus 200 disposed within a pipe 101. The pipe 101 is a conduit through which fluid can flow. Fluid can include gas, liquid, or a mixture of both. For example, the pipe 101 is a flowline that can carry water, hydrocarbons (which can include gaseous hydrocarbons, liquid hydrocarbons, or both), or a mixture of both water and hydrocarbons. For example, the pipe 101 is a hydrocarbon flowline that transports hydrocarbons extracted from a well to a processing plant or from a processing plant to a distribution center. In some implementations, the pipe 101 spans several miles (in some cases, several hundreds of miles) and includes multiple access points for entry into the inner volume of the pipe 101. In some cases, the fluid flowing through the pipe 101 includes solid material (such as debris). In some cases, one or more components in the fluid can precipitate out of the fluid and deposit on an inner wall of the pipe 101. In some cases, one or more components in the fluid reacts with the inner wall of the pipe 101 and the inner wall of the pipe 101 corrodes. In such cases, corrosion deposits can form on the inner wall of the pipe 101.

Figure 3:
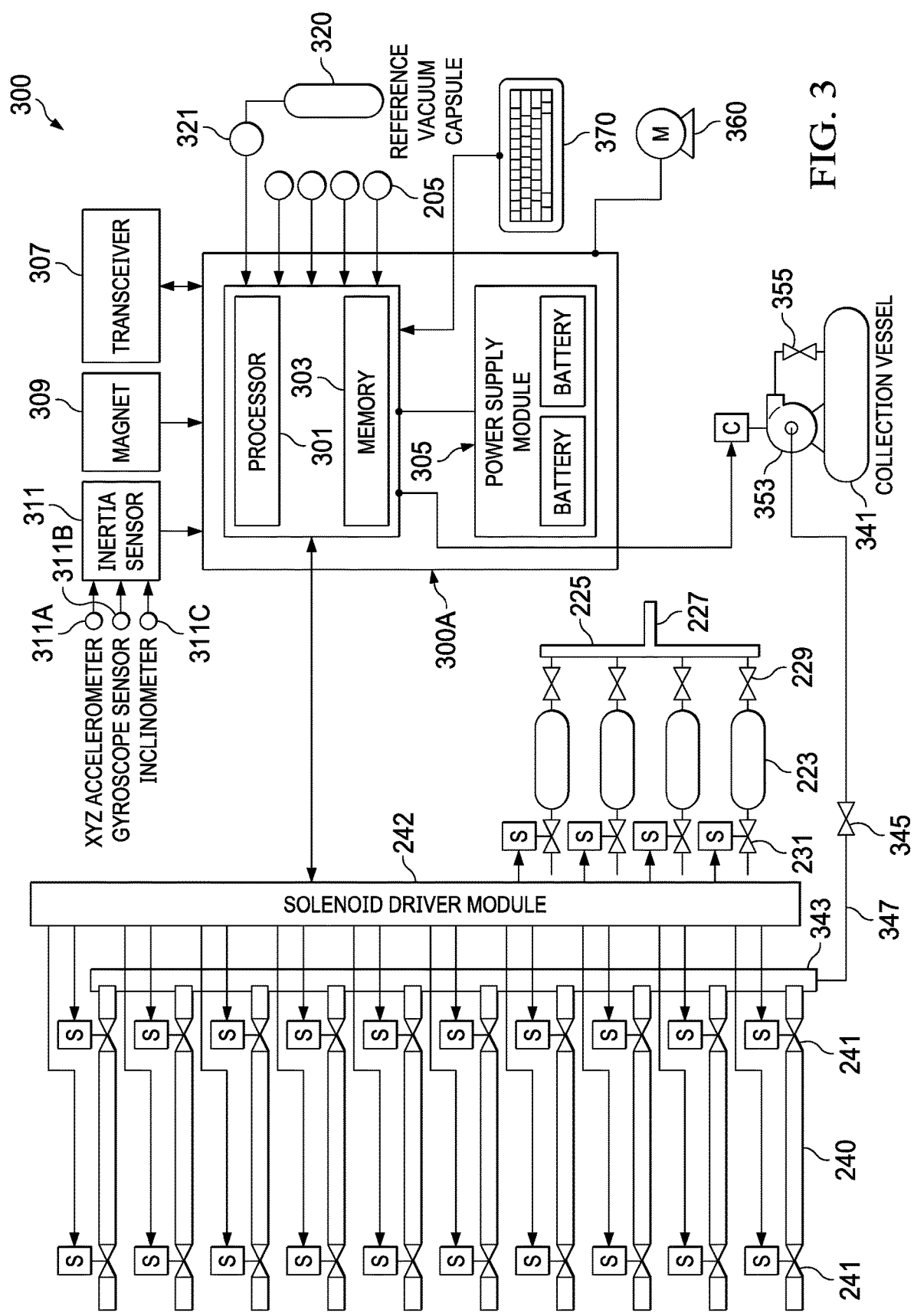
FIG. 3 is a schematic diagram of an example control system of the sampling apparatus.

The sampling apparatus 200 can be used to obtain one or more fluid samples, one or more solid samples, or both, as the sampling apparatus 200 travels through the pipe 101. The sampling apparatus 200 is capable of determining its relative location (for example, radial location, axial location, or both) within the pipe 101 as the samples are obtained. In some implementations, the sampling apparatus 200 measures one or more properties of the fluid flowing within the pipe 101 (such as pressure). In such implementations, the sampling apparatus 200 is self-locating. For example, the sampling apparatus 200 determines its location within the pipe 101 as a fluid sample is obtained, as a solid sample is obtained, or as a measurement is taken. In some implementations, the sampling apparatus 200 is physically pushed or pulled through the pipe 101. In some implementations, the sampling apparatus 200 is pushed through the pipe 101 by the fluid flowing through the pipe 101 (for example, hydraulic force). In some implementations, the sampling apparatus 200 propels itself through the pipe 101, for example, by use of a pump that is included in the apparatus 200. An example pump (353) is shown in FIG. 3 and described in more detail later.

Figure 2A:
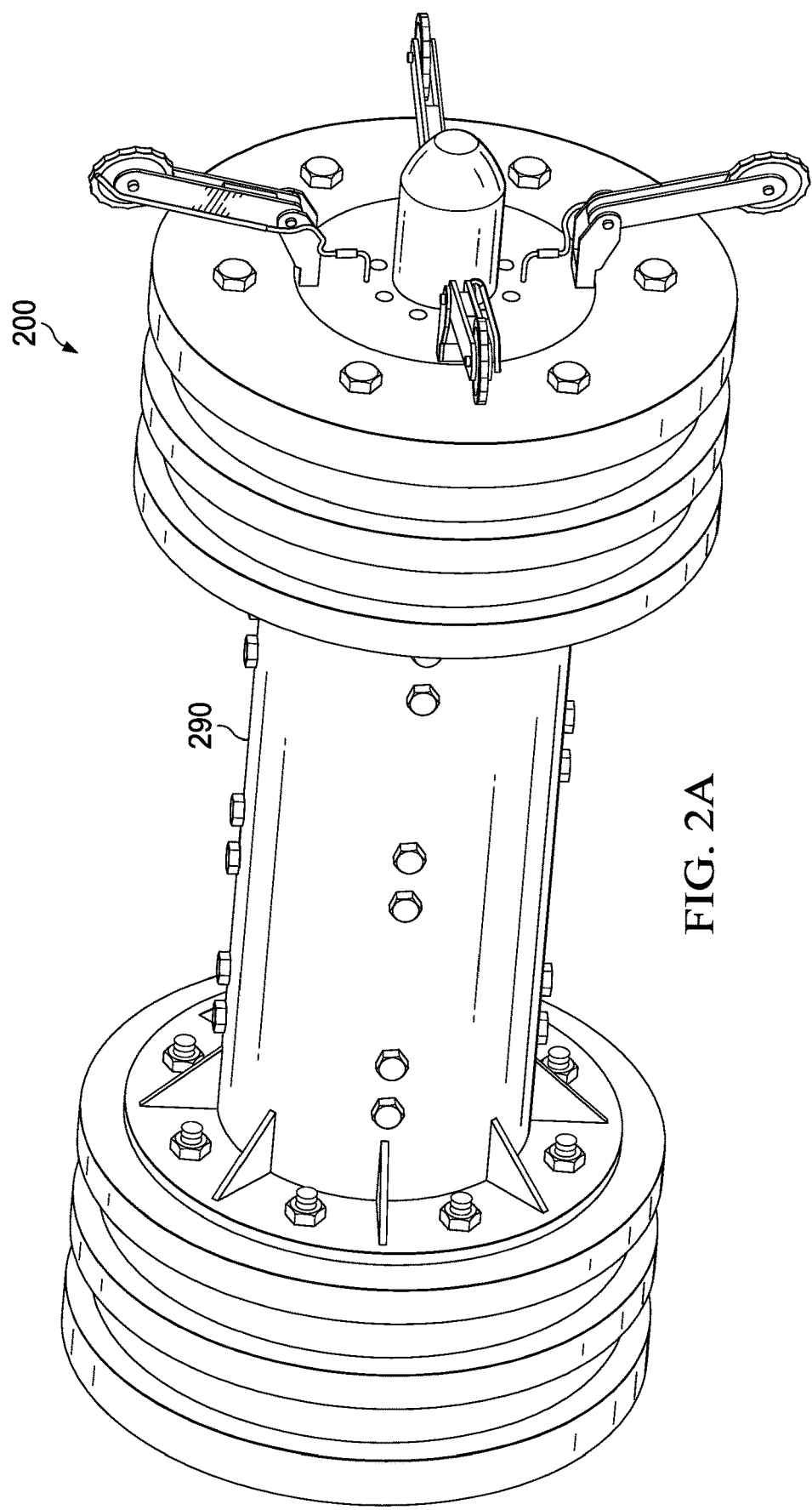
FIG. 2A is a schematic diagram of the sampling apparatus.

FIG. 2A is a schematic diagram of the sampling apparatus 200. As shown in FIG. 2A, the sampling apparatus 200 is coupled to a pipeline scraper body 290. The pipeline scraper body 290 can be a conventional pig scraper that can, in some cases, be used to hold together components of the sampling apparatus 200. For example, the pipeline scraper body 290 holds components, such as a sampling conduit, a solenoid valve, a sampling pump, and a control system.

Figure 2B:
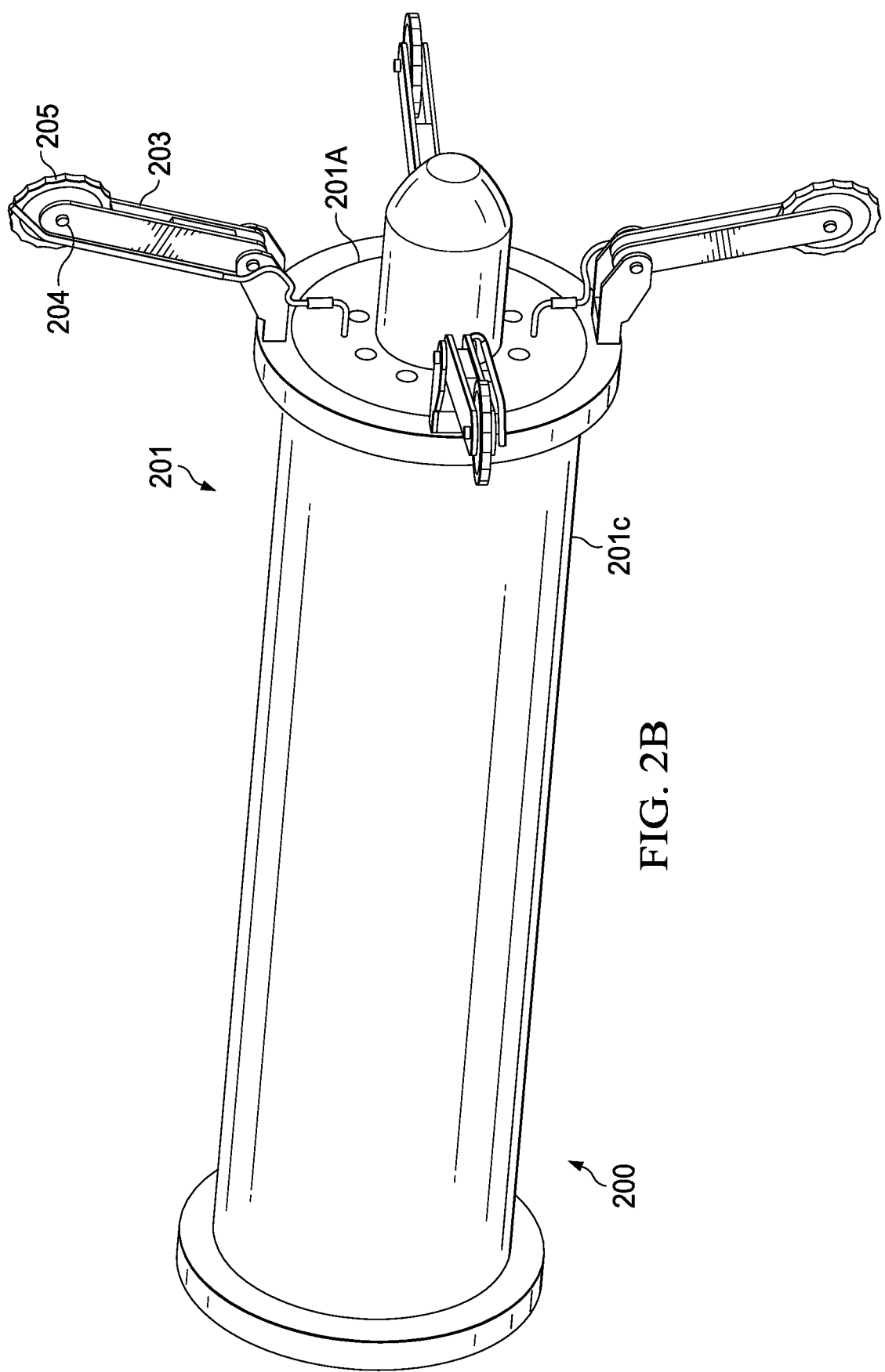
FIG. 2B is a schematic diagram of the body of the sampling apparatus of FIG. 2A.

FIG. 2B is a schematic diagram of the sampling apparatus 200 of FIG. 2A without the pipeline scraper body 290. In some implementations, the sampling apparatus 200 can still perform its required functions without the use of the pipeline scraper body 290. The sampling apparatus 200 includes a body 201 that is hollow. In some implementations, the body 201 includes a first plate 201A and a second plate 201B (not shown in FIG. 2A, but shown later in other figures) opposite the first plate 201A. In some implementations, the body 201 includes a cylindrical housing 201C that extends from the first plate 201A to the second plate 201B.

The sampling apparatus 200 includes an arm 203 extending from the body 201. The arm is shown in more detail in FIG. 2G and is also described in more detail later. Referring back to FIG. 2B, the sampling apparatus 200 includes an odometer wheel 205 coupled to the arm 203 at a coupling point 204 on the arm 203. The odometer wheel 205 is configured to rotate about the coupling point 204 with respect to the arm 203. In some implementations, the coupling point 204 includes a slot and a pin that is received by the slot. The odometer wheel 205 is mounted on the pin. In some implementations, the pin passes through the odometer wheel 205. The pin is received by the slot, such that the odometer wheel 205 is coupled to the arm 203. In some implementations, the odometer wheel 205 is rotationally fixed to the pin, and the pin and the odometer wheel 205 rotate together. In some implementations, the pin is rotationally fixed to the slot, and the odometer wheel 205 is free to rotate about the pin.

The odometer wheel 205 is configured to contact an inner wall of the pipe 101. While contacting the inner wall of the pipe 101 and rotating about the coupling point 204, odometer wheel 205 is configured to measure a distance traveled by the apparatus 200 within the pipe 101. The odometer wheel 205 includes embedded electronics. The embedded electronics can include an accelerometer and a revolutions per minute (rpm) counter, each of which can communicate with a control system (for example, the control system 300 which is shown in FIG. 3 and described in more detail later).

The odometer wheel 205 can transmit acceleration data to the control system, and the control system can determine whether the odometer wheel 205 is slipping. If the control system determines that the odometer wheel 205 slippage has exceeded a predetermined slippage threshold, the control system disregards rpm data transmitted by that particular odometer wheel 205. The odometer wheel 205 and the control system can be used to calculate various conditions. For example, the control system can calculate a time averaged rpm to determine a distance traveled by the apparatus 200 within a time interval (predetermined by a user) by multiplying the time averaged rpm, the time interval, and the outer circumference of the odometer wheel 205. The result can include compensation for acceleration (for example, by using a x-y-z accelerometer 311A and gyroscope sensor 311B, both of which are shown in FIG. 3 and described in more detail later). The distance calculation can be carried out for every time averaged rpm that is calculated for each time interval. The distances, the sum of the distances, or both can be stored in a storage device (for example, a memory of the control system, which is shown in FIG. 3 and described in more detail later).

As shown in FIG. 2B, the sampling apparatus 200 can include more than one set of the arm 203 and odometer wheel 205. For example, the sampling apparatus 200 can include two sets of the arm 203 and odometer wheel 205, three sets of the arm 203 and odometer wheel 205, or four sets of the arm 203 and odometer wheel 205. In some implementations, the sampling apparatus 200 includes more than four sets of the arm 203 and odometer wheel 205. The multiple sets of the arm 203 and odometer wheel 205 can facilitate radially centering of the sampling apparatus 200 within the pipe 101.

In some implementations, the sampling apparatus 200 includes an abrasive wheel that is coupled to another one of the arms 203. In some implementations, the odometer wheel 205 functions also as the abrasive wheel as described here. In some implementations, the abrasive wheel is configured to rotate about a coupling point (similar to the coupling point 204) with respect to the arm 203 to which the abrasive wheel is coupled. The abrasive wheel is mounted on a pin received by a slot (similar to the coupling point 204). In some implementations, the pin passes through the abrasive wheel. The pin is received by the slot, such that the abrasive wheel is coupled to the arm 203. In some implementations, the abrasive wheel is rotationally fixed to the pin, and the pin and the abrasive wheel rotate together. In some implementations, the pin is rotationally fixed to the slot, and the abrasive wheel is free to rotate about the pin. The abrasive wheel is configured to contact an inner wall of the pipe 101. While contacting the inner wall of the pipe 101 and rotating, the abrasive wheel is configured to remove material disposed on the inner wall of the pipe 101 (for example, debris, corrosion/precipitate deposits, or both) by abrasion.

In some cases, the sampling apparatus 200 may move through the pipe 101 in a direction different from an axial direction (that is, in a direction parallel to the longitudinal axis of the pipe 101). For example, the sampling apparatus 200 may rotate within the pipe 101. Rotation can be determined, for example, by the x-y-z accelerometer 311A and gyroscope sensor 311B. This rotation can be accounted for in any calculations performed by the control system 300.

Although shown in FIG. 2B as having the arm 203 extending from the first plate 201A, the arm 203 can extend from the second plate 201B. In some implementations, the sampling apparatus 200 includes at least one arm 203 (coupled to the odometer wheel 205) extending from the first plate 201A and at least one arm 203 (coupled to another odometer wheel 205) extending from the second plate 201B. Including additional sets of arms 203 coupled to odometer wheels 205 can provide various benefits. For example, having additional arms 203 can improve centering of the sampling apparatus 200 within the pipe 101 with respect to the cross-sectional area of the pipe 101. For example, having additional odometer wheels 205 can improve accuracy of distance measuring. In some implementations, an average of the measured distances by the multiple odometer wheels 205 is taken as the determined distance traveled by the sampling apparatus 200 within the pipe 101. In some implementations, a median of the measured distances by the multiple odometer wheels 205 is taken as the determined distance traveled by the sampling apparatus 200 within the pipe 101. In some implementations, it can be determined that one or more of the odometer wheels 205 need to be re-calibrated, repaired, or replaced based on a deviation from the average or median that is greater than a threshold deviation. For example, if one (or more) of the odometer wheels 205 takes a reading that is 1 meter greater or less than the average reading by all of the odometer wheels 205, that reading can be taken out of the average calculation. The readings from the corresponding odometer wheel 205 can be disregarded for the remainder of the run through the pipe 101, and that odometer wheel 205 can be flagged for inspection after the run has been completed.

In some implementations, the sampling apparatus 200 begins measuring distance before the sampling apparatus 200 enters the pipe 101—that is, the sampling apparatus 200 is turned "on" before it begins traveling through the pipe 101. In some implementations, the sampling apparatus 200 is configured to begin measuring distance after an inertia sensor of the sampling apparatus 200 detects movement of the sampling apparatus 200. In some implementations, the sampling apparatus 200 is configured to begin measuring distance when it detects that it is positioned within the pipe 101. The sampling apparatus 200 can detect when it is positioned within the pipe 101, for example, by detecting that its odometer wheels 205 are in contact with the inner wall of the pipe 101. In some implementations, the sampling apparatus 200 is configured to begin measuring distance after a predetermined time delay once the sampling apparatus 200 enters the pipe 101.

In some implementations, the sampling apparatus 200 is configured to switch to a "sleep" mode, which is a low-power mode to conserve energy. The sampling apparatus 200 can switch to the "sleep" mode in response to a triggering event. The triggering event can be, for example, collection of a sample (for example, go in "sleep" mode for a predetermined time period after each sample is taken and then switch back to "wake" mode after the predetermined time period), collection of a sample at a predetermined location within the pipe 101, collection of a final sample (that is, the last available sampling conduit has been filled), and detecting travel across a marker located along the longitudinal length of the pipe 101 (for example, a clamp-on marker or transmitter). In some implementations, the sampling apparatus 200 is configured to periodically switch between "sleep" and "wake" modes. Switching to "sleep" mode can conserve energy and reduce energy requirements, which allows for reduced battery weight and therefore overall weight of the sampling apparatus 200.

Figure 2C:
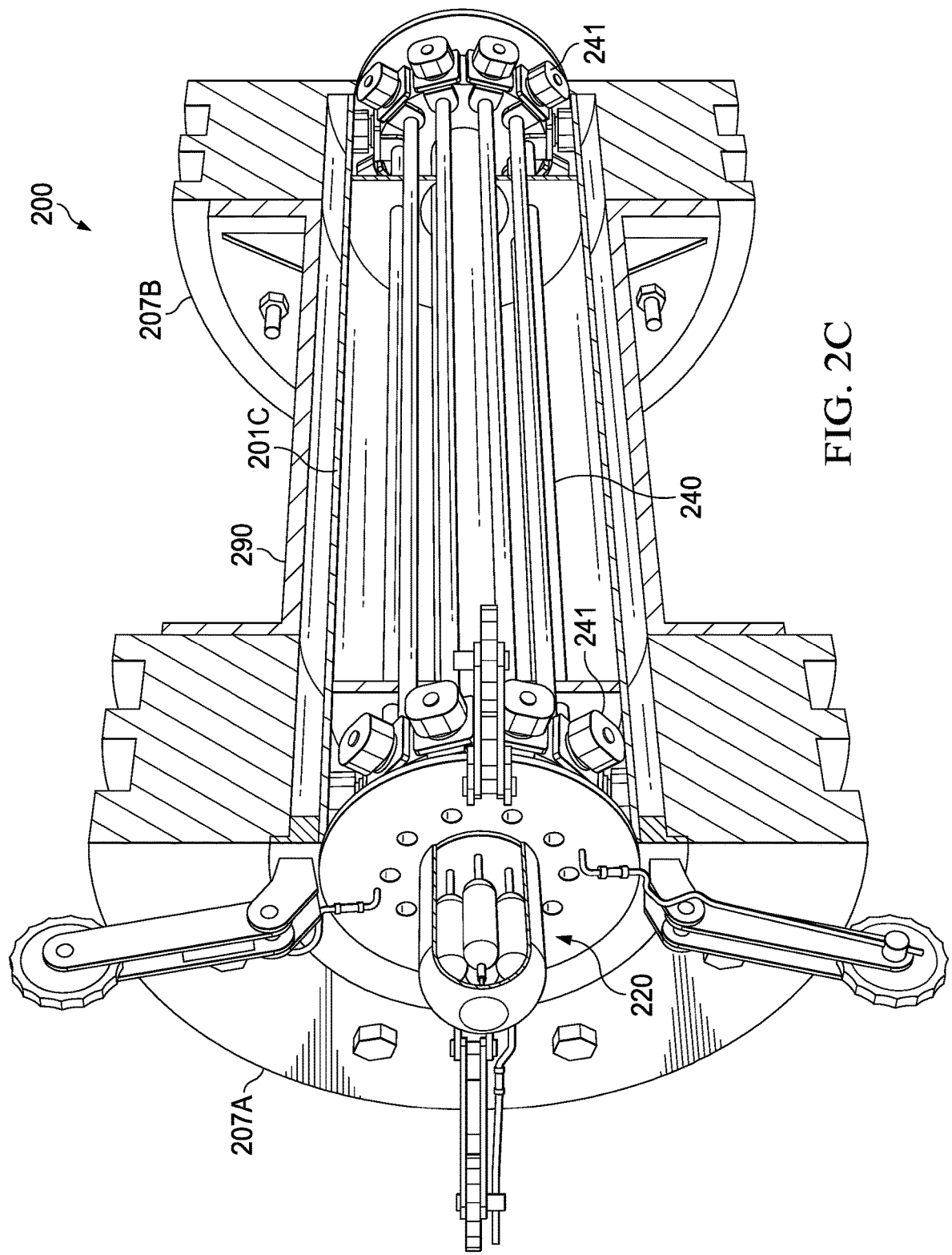
FIG. 2C is a schematic diagram that shows inner components of the sampling apparatus of FIG. 2A.

FIG. 2C is a schematic diagram that shows inner components of the sampling apparatus 200. The body 201 is disposed within and coupled to the pipeline scraper body 290. The sampling apparatus 200 includes an elastomeric ring 207A that surrounds at least a portion of the body 201. The elastomeric ring 207A is configured to contact the inner wall of the pipe 101 and remove material disposed on the inner wall of the pipe 101 (for example, debris, corrosion/precipitate deposits, or both) as the sampling apparatus 200 travels through the pipe 101. In some implementations, the outer diameter of the elastomeric ring 207A is the same as the inner diameter of the pipe 101. In some implementations, the outer diameter of the elastomeric ring 207A is slightly larger than the inner diameter of the pipe 101, but due to the flexibility of the elastomeric ring 207A and the rigidity of the pipe 101, the sampling apparatus 200 can still be pushed or pulled through the pipe 101. In some implementations (as shown in FIG. 2C), the sampling apparatus 200 includes an additional elastomeric ring 207B that surrounds another portion of the body 201 and is substantially similar to the elastomeric ring 207A. Although shown in FIG. 2C as having two elastomeric rings (207A, 207B), the sampling apparatus 200 can include fewer (for example, one) or additional (for example, three) elastomeric rings.

The sampling apparatus 200 includes a solid sampling subsystem 220. The solid sampling subsystem 220 can be used to obtain a sample of the solid(s) that are removed from the inner wall of the pipe 101 (for example, by the elastomeric ring 207A, 207B, or both). One or more solid samples can be stored within the solid sampling subsystem 220 as the sampling apparatus 200 travels through the pipe. In some implementations, the solid sampling subsystem 220 is coupled to and external to the body 201. In some implementations (as shown in FIG. 2C), the solid sampling subsystem 220 is coupled to and protruding from the first plate 201A. In some implementations, the solid sampling subsystem 220 is coupled to and protruding from the second plate 201B. In some implementations, the sampling apparatus 200 includes more than one solid sampling subsystem 220. The solid sampling subsystem 220 is shown in more detail in FIGS. 2E, 2F, and 2G and is also described in more detail later.

The sampling apparatus 200 includes a fluid sampling conduit 240. In some implementations, the fluid sampling conduit 240 is disposed within the body 201. The fluid sampling conduit 240 is configured to obtain a sample of the fluid that is flowing in the pipe 101. As shown in FIG. 2C, the sampling apparatus 200 can include more than one fluid sampling conduit 240. For example, the sampling apparatus 200 can include two fluid sampling conduits 240, three fluid sampling conduits 240, or four fluid sampling conduits 240. In some implementations, the sampling apparatus 200 includes more than four fluid sampling conduits 240. In implementations in which the sampling apparatus 200 includes multiple fluid sampling conduits 240, the fluid sampling conduits 240 can be distributed at different radial locations within the body 201. Each fluid sampling conduit 240 can obtain a fluid sample from the pipe and store the fluid sample as the sampling apparatus 200 travels through the pipe. In implementations where the sampling apparatus 200 includes multiple fluid sampling conduits 240, the sampling apparatus 200 can obtain multiple fluid samples. The multiple fluid samples can be obtained at one location or at various, different locations within the pipe 101. For example, one or more fluid samples can be obtained at a first location, and then one or more fluid samples can be obtained at a second location. The sampling apparatus 200 can keep track of which fluid sampling conduits 240 have been used (and therefore contain samples) as the sampling apparatus 200 travels through the pipe 101. The sampling apparatus 200 can also keep track of the location and time at which each fluid sampling conduit 240 has been used, which can be used to map the samples to the relative positions within the pipe 101 from which the samples were obtained.

In some implementations (as shown in FIG. 2C), the fluid sampling conduit 240 is disposed within the cylindrical housing 201C and extends from the first plate 201A to the second plate 201B. In some implementations, the fluid sampling conduit 240 includes a first open end at the first plate 201A and a second open end at the second plate 201B. In some implementations, the first open end and the second open end of the fluid sampling conduit 240 are threaded, and the first plate 201A and the second plate 201B include threaded holes. In such implementations, the first open end and the second open end of the fluid sampling conduit 240 can be threadedly coupled to the first plate 201A and the second plate 201B, respectively. In some implementations, the first open end and the second open end of the fluid sampling conduit 240 are outwardly threaded and inwardly threaded, so that each open end can be threadedly coupled to two components. For example, the outward threads can threadedly couple to the threaded holes of the first and second plates 201A and 201B, and the inward threads can be used to threadedly couple to a sealing plug to prevent leaks, for example, in a laboratory or during transportation of the sampling apparatus 200.

The sampling apparatus 200 can include isolation valves 241 near each open end of the fluid sampling conduit 240. In some implementations, the isolation valves 241 are solenoid valves. The isolation valves 241 can be opened and closed to control the flow of fluid into and out of the fluid sampling conduit 240. For example, one or both of the isolation valves 241 can be opened to allow fluid from the pipe 101 to enter the fluid sampling conduit 240. After a period of time (for example, after a sufficient volume of fluid has entered the fluid sampling conduit 240), the isolation valve(s) 241 can be closed to store the fluid within the fluid sampling conduit 240. In this way, the fluid sampling conduit 240 can obtain a sample of the fluid flowing within the pipe 101.

In some implementations, the fluid sampling conduit 240 is equipped with a telescoping mechanism, which allows the fluid sampling conduit 240 to be projected and allow collecting of fluid samples at a distance from a tail end (downstream end in the direction of fluid flow within the pipe 101) of the apparatus 200. This projected position can allow for the avoidance of turbulence in the flow profile that the head end (upstream end) of the apparatus 200 may experience.

The sampling apparatus 200 includes a control system (300, which is shown in FIG. 3) that controls various components of the sampling apparatus 200. For example, the control system 300 controls the various valves of the sampling apparatus 200 (for example, the isolation valves 241). For example, the control system 300 determines which of the fluid sampling conduits 240 to use to obtain a fluid sample. For example, the control system 300 determines which of the vacuum capsules 223 to use to obtain a solid sample. The control system 300 is described in more detail later.

Figure 2D:
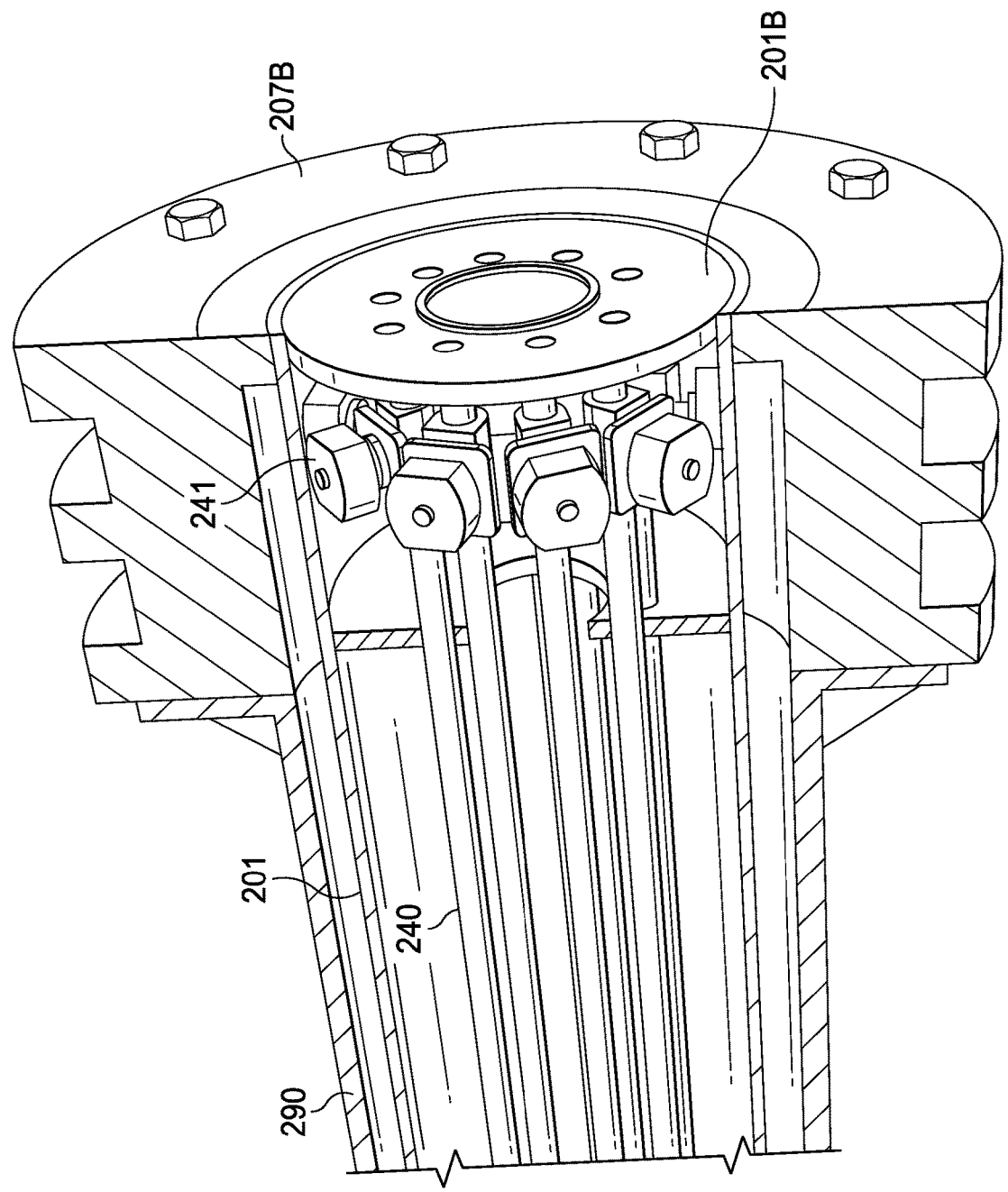
FIG. 2D is a schematic diagram that shows inner components of the sampling apparatus of FIG. 2A.

FIG. 2D is a schematic diagram that shows inner components of the sampling apparatus 200. This view shows the second plate 201B and the second elastomeric ring 207B that were mentioned previously. This view also shows the second open end of the fluid sampling conduit 240 at the second plate 201B.

Figure 2E:
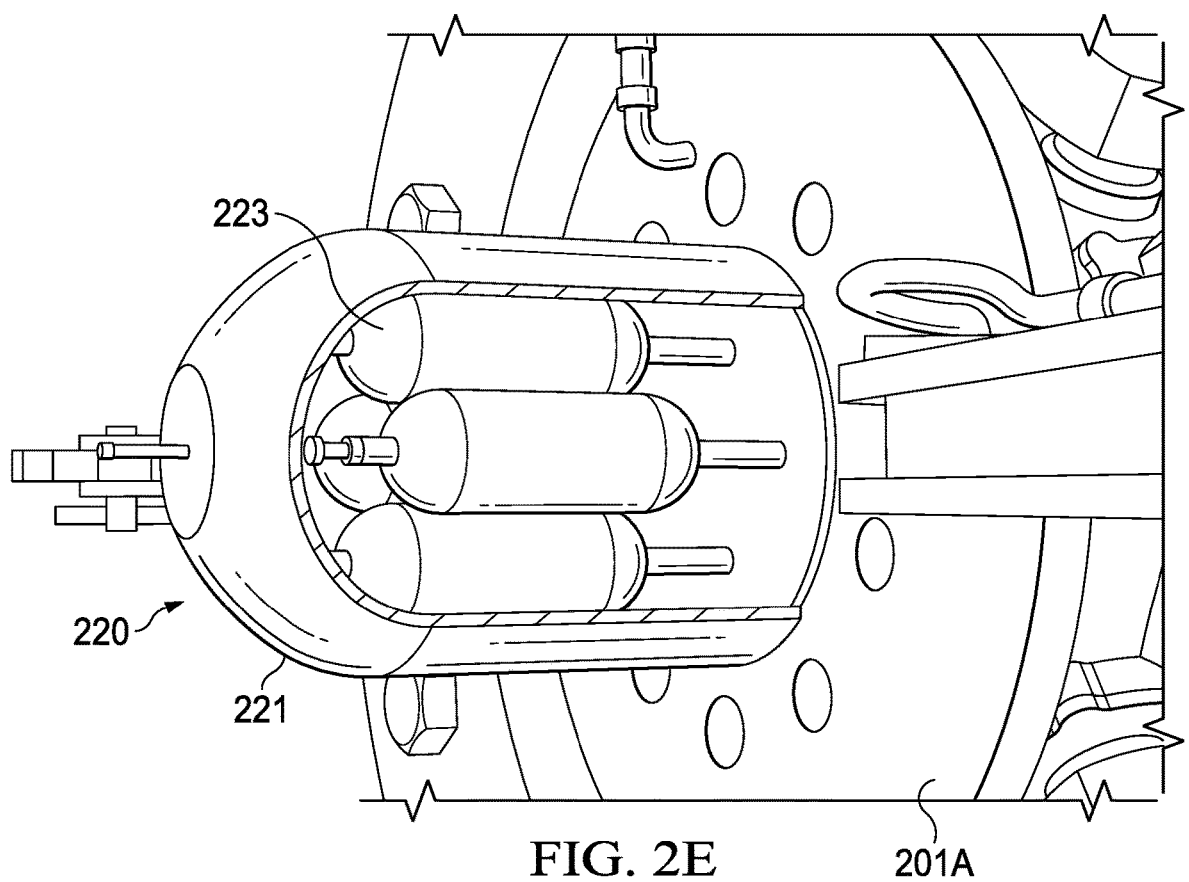
FIG. 2E is a schematic diagram of a subsystem of the sampling apparatus of FIG. 2A.

FIG. 2E is a schematic diagram of the solid sampling subsystem 220 of the sampling apparatus 200. In some implementations, the solid sampling subsystem 220 includes a housing 221. In implementations in which the solid sampling subsystem 220 is coupled to the first plate 201A, the housing 221 is coupled to the first plate 201A. In implementations in which the solid sampling subsystem 220 is coupled to the second plate 201B, the housing 221 is coupled to the second plate 201B. A capsule 223 is disposed within the housing 221.

In some implementations, the capsule 223 is a vacuum capsule. In such implementations, the capsule 223 (before the sampling apparatus 200 is positioned within the pipe 101) has an internal pressure that is less than atmospheric pressure. As shown in FIG. 2E, the solid sampling subsystem 220 can include multiple capsules 223 disposed within the housing 221. Each of the capsules 223 can store a solid sample. In implementations where the sampling apparatus 200 includes multiple capsules 223, the sampling apparatus 200 can obtain multiple solid samples. The multiple solid samples can be obtained at one location or at various, different locations within the pipe 101. For example, one or more solid samples can be obtained at a first location, and then one or more solid samples can be obtained at a second location. The sampling apparatus 200 can keep track of which vacuum capsules 223 have been used (and therefore contain samples) as the sampling apparatus 200 travels through the pipe 101.

In some implementations, the capsule 223 is a pressurized capsule. In such implementations, the capsule 223 (before the sampling apparatus 200 is positioned within the pipe 101) has an internal pressure that is greater than atmospheric pressure. In some implementations, the capsule 223 includes a pressurized treatment fluid. In such implementations, the treatment fluid can be discharged from the capsule and into the pipe 101. The treatment fluid can, for example, react with contaminants disposed on the inner wall of the pipe 101 and can facilitate removal of such contaminants from the inner wall of the pipe 101. In some implementations, the treatment fluid includes a biocide, for example, to treat organic corrosion resulting from sulfur-reducing bacteria.

In some implementation, the capsule 223 includes solid particles. In some implementations, the solid particles are magnetic particles. In such implementations, the magnetic particles can be discharged from the capsule and into the pipe 101. The magnetic particles can, for example, adhere to the inner wall of the pipe 101. Once adhered to the inner wall of the pipe 101, the magnetic particles can be detected from outside the pipe 101 by detection of the magnetic field generated by the magnetic particles. The magnetic particles can therefore be used as markers.

Figure 2F:
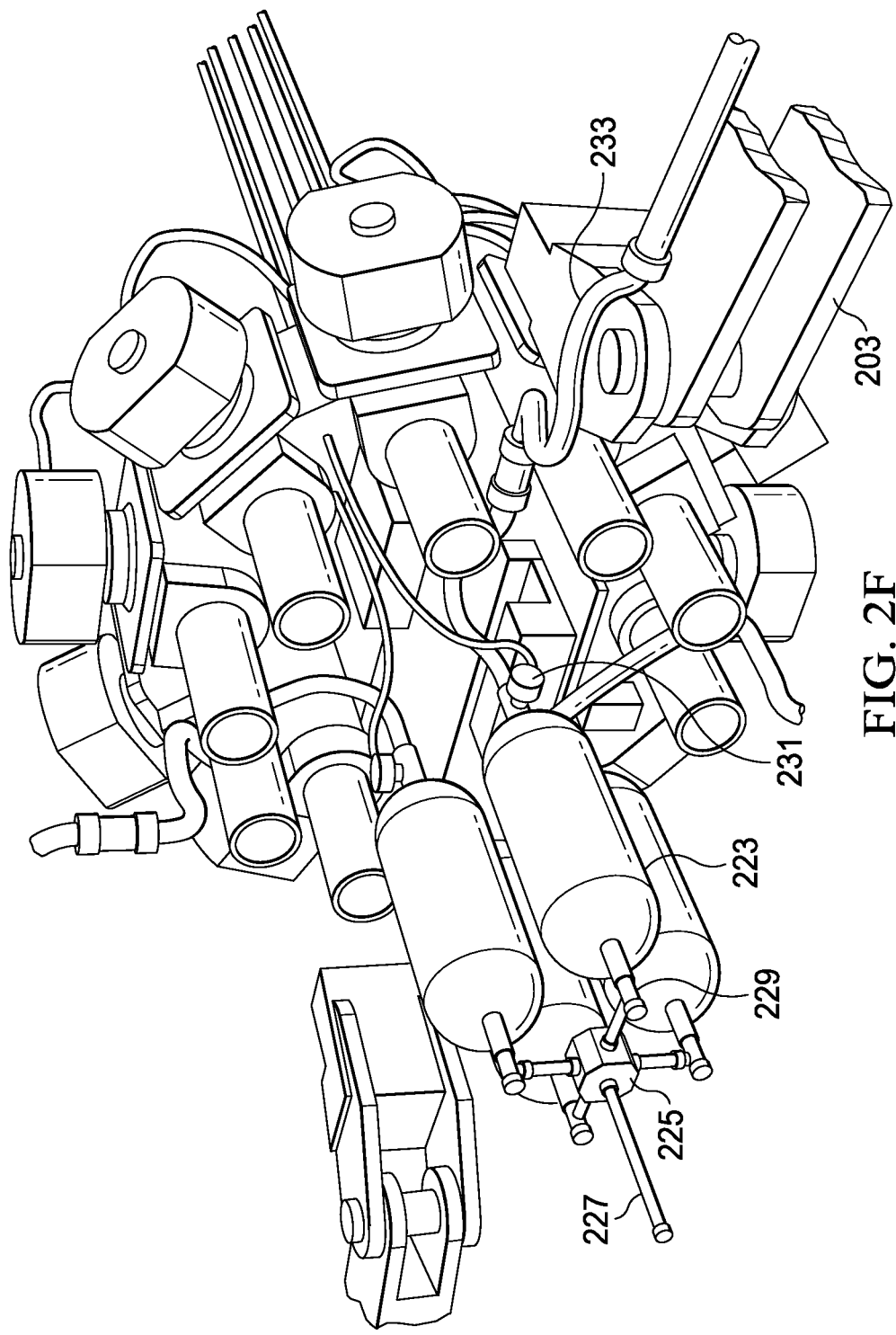
FIG. 2F is schematic diagram that shows inner components of the sampling apparatus of FIG. 2A.

FIG. 2F is a schematic diagram that shows inner components of the sampling apparatus 200. In FIG. 2F, the housing 221 is omitted to show some of the other inner components of the solid sampling subsystem 220. The solid sampling subsystem 220 includes an inlet valve 231 that is coupled to the vacuum capsule 223. The inlet valve 231 is configured to control flow of material into the vacuum capsule 223. Before the inlet valve 231 is opened, the pressure within the vacuum capsule 223 is less than atmospheric pressure.

The solid sampling subsystem 220 includes a tubing 233 that is also coupled to the inlet valve 231. The tubing 233 is positioned such that its open end is in the vicinity of the inner wall of the pipe 101 while the sampling apparatus 200 travels through the pipe 101. Because of this configuration, solid material that has been removed from the inner wall of the pipe 101 (for example, by the elastomeric ring 207A, 207B, or both) can enter the tubing 233. In some implementations, the tubing 233 is disposed along one of the arms 203.

When the inlet valve 231 is opened, the vacuum within the vacuum capsule 223 pulls the solid material into the vacuum capsule 223. After a period of time, the inlet valve 231 is closed, and the solid sample is stored within the vacuum capsule 223. In implementations in which the solid sampling subsystem 220 includes multiple vacuum capsules 223, each of the vacuum capsules 223 are equipped with its own inlet valve 231 coupled to its own tubing 233. In some implementations, each tubing 233 is disposed along a different one of the arms 203. In some implementations, the sampling apparatus 200 includes the same number of arms 203, odometer wheels 205, vacuum capsules 223, and tubings 233.

The solid sampling subsystem 220 includes an outlet valve 229 coupled to the vacuum capsule 223. The outlet valve 229 is configured to control flow of material out of the vacuum capsule 223. In implementations in which the solid sampling subsystem 220 includes multiple vacuum capsules 223, each of the vacuum capsules 223 are equipped with its own outlet valve 229. In such implementations, the solid sampling subsystem 220 can include a manifold 225 to connect the outlets of each of the outlet valves 229. In some implementations, the solid sampling subsystem 220 includes a suction tubing 227 which can be coupled to a device that produces suction (for example, a suction pump), so that any of the solid sample(s) stored in the vacuum capsule(s) can be removed from the respective vacuum capsule and subsequently analyzed.

For example, after the sampling apparatus 200 has traveled through the pipe 101 and once analysis of the obtained samples is ready to begin, outlet valve 229 can be opened, so that the solid sample stored within the vacuum capsule 223 can flow out of the vacuum capsule 223 through the manifold 225 and suction tubing 227. The solid sample can then be analyzed (for example, to determine composition).

Figure 2G:
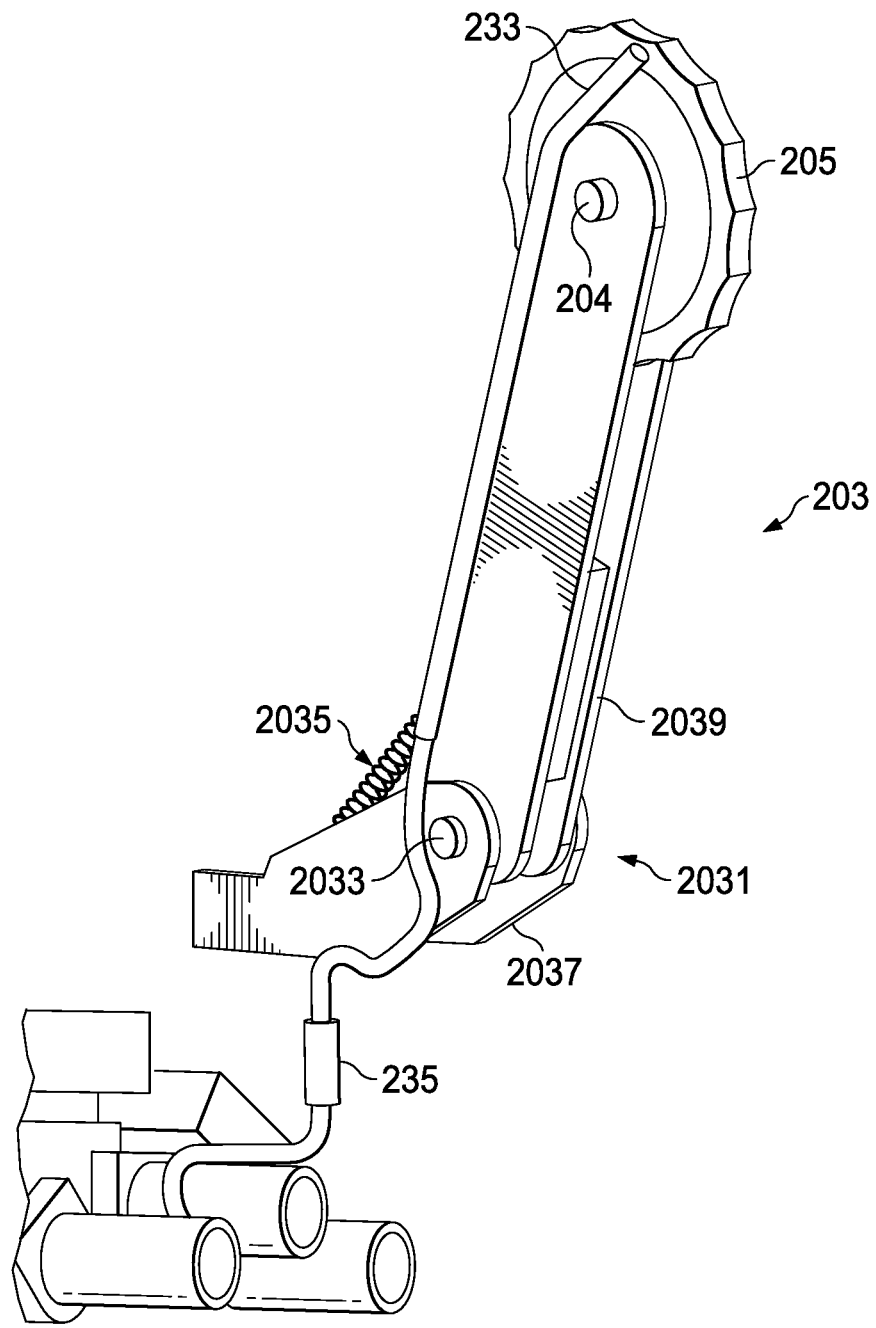
FIG. 2G is a schematic diagram of an arm of the sampling apparatus of FIG. 2A.

FIG. 2G is a schematic diagram of the arm 203 of the sampling apparatus 200 and a few neighboring components. In some implementations, the arm 203 includes a first segment 2037 and a second segment 2039 that are connected together at a joint 2031, for example, by a bolt 2033. The joint 2031 is configured to allow rotation of the second segment 2039 about the joint 2031 in relation to the first segment 2037. In some implementations, the first segment 2037 is coupled to the first plate 201A and is stationary relative to the body 201 (see also FIG. 2B). In some implementations, the joint 2031 is equipped with a spring 2035 that biases the second segment 2039 to protrude radially from the body 201 so that the odometer wheel 205 contacts the inner wall of the pipe 101 when the sampling apparatus 200 is positioned within the pipe 101. As shown in FIGS. 2A and 2B, the ends of the arms 203 (coupled to the odometer wheels 205) protrude radially from the body 201. In some implementations, the ends of the arms 203 protrude radially past the outer circumference of the elastomeric rings 207A and 207B. However, because the arms 203 are jointed, the arms 203 can bend at their respective joints 2031. When the sampling apparatus 200 is positioned within the pipe 101, the rigid, inner wall of the pipe 101 pushes the odometer wheels 205 and causes the second segments 2039 of the respective arms 203 to retract radially. The springs 2035 (which bias the second segments 2039 to protrude radially) allow for the odometer wheels 205 to maintain contact with the inner wall of the pipe 101 as the sampling apparatus 200 travels through the pipe 101.

As shown in FIG. 2G, the tubing 233 is disposed along the arm 203. In some implementations, a portion of the tubing 233 is metallic or disposed within a hollow metallic casing. In some implementations, the sampling apparatus 200 includes an additional valve 235 (separate and in addition to the inlet valve 231 described previously and shown in FIG. 2F). The valve 235 can be a solenoid valve. In some implementations, the valve 235 is disposed nearer to the odometer wheel 205 in comparison to the view shown in FIG. 2G.

FIG. 3 is a schematic diagram of an example control system 300. The sampling apparatus 200 includes the control system 300. The control system 300 is used to provide computational functionalities associated with described algorithms, methods, functions, processes, flows, and procedures, as described in this specification, according to an implementation.

The control system 300 includes a computer 300A. The illustrated computer 300A is intended to encompass any computing device such as a server, desktop computer, laptop/notebook computer, one or more processors within these devices, or any other suitable processing device, including physical or virtual instances (or both) of the computing device. Additionally, the computer 300A can include a computer that includes an input device, such as a keypad, keyboard 370, touch screen, or other device that can accept user information, and an output device that conveys information associated with the operation of the computer 300A, including digital data, visual, audio information, or a combination of information.

In some implementations, the computer 300A includes an interface. The interface can provide a visual indication of one or more statuses, for example, the status of one or more of the valves of the apparatus 200 (open, closed, error, de-energized), the status of one or more of the fluid sampling conduits 240 (empty, full), the status of one or more of the vacuum capsules 223 (empty, full), power supply, and fill level of a collection vessel (for example, the collection vessel 341, described later). In some implementations, two or more interfaces may be used according to particular needs, desires, or particular implementations of the computer 300A. Although not shown in FIG. 3, the computer 300A can be communicably coupled with a network. The interface can used by the computer 300A for communicating with other systems that are connected to the network in a distributed environment. Generally, the interface comprises logic encoded in software or hardware (or a combination of software and hardware) and is operable to communicate with the network. More specifically, the interface may comprise software supporting one or more communication protocols associated with communications such that the network or interface's hardware is operable to communicate physical signals within and outside of the illustrated computer 300A.

The computer 300A includes a processor 301. Although illustrated as a single processor 301 in FIG. 3, two or more processors 301 can be used according to particular needs, desires, or particular implementations of the computer 300A. Generally, the processor 301 executes instructions and manipulates data to perform the operations of the computer 300A and any algorithms, methods, functions, processes, flows, and procedures as described in this specification.

The computer 300A includes a memory 303 that can hold data for the computer 300A or other components (or a combination of both) that can be connected to the network. Although illustrated as a single memory 303 in FIG. 3, two or more memories 303 (of the same or combination of types) can be used according to particular needs, desires, or particular implementations of the computer 300A and the described functionality. While memory 303 is illustrated as an integral component of the computer 300A, memory 303 can be external to the computer 300A. The memory 303 can be a transitory or non-transitory storage medium.

The memory 303 stores computer-readable instructions executable by the processor 301 that, when executed, cause the processor 301 to perform operations, such as those described in this disclosure.

In some implementations, the computer 300A includes a power supply module 305. The power supply module 305 can include a rechargeable or non-rechargeable battery that can be configured to be either user- or non-user-replaceable. In some implementations, the power supply module 305 includes a single battery. In some implementations, the power supply module 305 includes two or more batteries. The power supply module 305 can be hard-wired. In some implementations, the computer 300A is configured to monitor power supply. For example, if the computer 300A determines that the available power is not sufficient to complete a sample collection run through the entire length of the pipe 101, the computer 300A can abort the run and de-energize all of the solenoid valves.

There may be any number of computers 300A associated with, or external to, a computer system containing computer 300A, each computer 300A communicating over the network. Further, the term "client," "user," "operator," and other appropriate terminology may be used interchangeably, as appropriate, without departing from this specification. Moreover, this specification contemplates that many users may use one computer 300A, or that one user may use multiple computers 300A.

In some implementations, the computer 300A also includes a database that can hold data for the computer 300A or other components (or a combination of both) that can be connected to the network. In some implementations, two or more databases (of the same or combination of types) can be used according to particular needs, desires, or particular implementations of the computer 300A and the described functionality. In some implementations, the database is an integral component of the computer 300A. In some implementations, database is external to the computer 300A.

In some implementations, the control system 300 includes an inert gas pressurization inlet valve. The inert gas pressurization inlet valve can be used to inject inert gas into any of the fluid sampling conduits 240, any non-vacuum pipes, any closed cavities, and any internal electrical enclosures in the sampling apparatus 200 that may trap air, especially in cases in which the sampling apparatus 200 is used to sample gaseous fluids. The injection of inert gas can prevent formation of flammable mixtures.

The computer 300A is communicatively coupled to various components of the sampling apparatus 200 via wired connection, wireless connection, or a combination of both. For example, the computer 300A is communicatively coupled to the valves of the sampling apparatus 200, such as the valves 241 controlling the flow of fluid into and out of the fluid sampling conduit 240, the inlet valve 231 controlling the flow of material into the vacuum capsule 223, and the outlet valve 229 controlling the flow of material out of the vacuum capsule 223. In some implementations, the computer 300A is communicatively coupled to a solenoid driver module 242, which is also communicatively coupled to the aforementioned valves. The computer 300A can transmit an open signal to any of these valves. The computer 300A can transmit a close signal to any of these valves.

In some implementations, the computer 300A is configured to transmit a signal that causes the initiation of the telescoping mechanism of one or more of the fluid sampling conduits 240. In some implementations, the computer 300A is configured to maintain a log of which fluid sampling conduits 240 have been used to obtain fluid samples, so that those fluid sampling conduits 240 are not used again during the same run through of the pipe 101. In some implementations, the computer 300A is configured to maintain a log of which vacuum capsules 223 have been used to obtain solid samples, so that those vacuum capsules 223 are not used again during the same run through of the pipe 101.

In some implementations, all of the fluid sampling conduits 240 are connected by a header 343. In some implementations, the header 343 is connected to a collection pipe 347 that includes an isolation valve 345. In some implementations, the collection pipe 347 connects the header 343 to a collection vessel 341. The isolation valve 345 can be opened to allow fluid to flow from the header 343 into the collection vessel 341. The isolation valve 345 can be closed to prevent fluid from flowing from the header 343 into the collection vessel 341.

In some implementations, the control system 300 includes a collection pump 353. The collection pump 353 can be, for example, a servo-electric sampling pump. The collection pump 353 can facilitate flow of fluid from the pipe 101 into one or more of the fluid sampling conduits 240, for example, in cases where the pressure difference between the pipe 101 and the fluid sampling conduit 240 is not sufficient for adequate fluid flow into the fluid sampling conduit 240. The collection pump 353 can facilitate flow of fluid from the header 343 to the collection vessel 341, for example, in cases where the pressure in the header 343 is not sufficient for adequate fluid flow from the header 343 to the collection vessel 341. In some implementations, the control system 300 includes an additional isolation valve 355 downstream of the collection pump 353 and upstream of the collection vessel 341.

In some implementations, the collection pump 353 also serves as a propelling mechanism for the apparatus 200 to move through the pipe 101. For example, the collection pump 353 can pump fluid out of the collection vessel 341 and discharge the fluid out into the pipe 101. This jetting mechanism propels the apparatus 200 in a direction opposite to the direction of fluid discharge. The computer 300A can control the collection pump 353 to facilitate storing fluid in the collection vessel 341, discharge fluid from the collection vessel 341, or both.

In some implementations, the control system 300 includes a transceiver 307 communicatively coupled to the processor 301. The transceiver 307 can include, for example, an electromagnetic transceiver 307. In some implementations, the transceiver 307 is used to receive signals, transmit signals, or both. Although illustrated as a single transceiver 307 in FIG. 3, two or more transceivers 307 (of the same or combination of types) can be used according to particular needs, desires, or particular implementations of the computer 300A and the described functionality.

In some implementations, the control system 300 includes a magnet 309. The magnet 309 is configured to produce a magnetic field. A receiver can be coupled to the pipe 101 (for example, a clamp-on receiver), and the receiver can detect the nearby presence of the sampling apparatus 200 in response to detecting the magnetic field produced by the magnet 309. The receiver can be configured to transmit the location of the sampling apparatus 200 to a remote monitoring system. For example, the receiver can communicate with a Remote Terminal Unit (RTU) which can then communicate with a Supervisory Control and Data Acquisition (SCADA) system. In some implementations, the receiver coupled to the pipe 101 is an electrical magnet that generates magnetic flux pulses to an electromagnetic coil. Depending on the direction and predetermined location of the receiver, the control system 300 can detect the magnetic flux pulses generated by the receiver to verify or correct distance calculations. Multiple receivers can be distributed along the longitudinal length of the pipe 101 to help track the sampling apparatus 200 as it travels through the pipe 101.

In some implementations, the control system 300 includes at least four magnets 309 distributed along a circumference (for example, at 0°, 90°, 180°, and 270°). The receiver can detect the corresponding magnetic fields produced by each of the magnets 309 and can identify both the location and orientation (for example, rotation) of the sampling apparatus 200 within the pipe 101. In some implementations, the control system 300 communicates with the receiver and verifies or corrects distance calculations based on the communication with the receiver.

In some implementations, the control system 300 includes an inertia sensor 311. The inertia sensor 311 includes at least one of an x-y-z accelerometer 311A, a gyroscope sensor 311B, or an inclinometer 311C. In some implementations (as shown in FIG. 3), the inertia sensor 311 includes the x-y-z accelerometer 311A, the gyroscope sensor 311B, and the inclinometer 311C. The x-y-z accelerometer 311A is configured to sense axial, vertical radial, and horizontal radial acceleration of the sampling apparatus 200. The 3-axis measurements can be used in the traveled distance calculations. The 3-axis measurements can also be used to record any anomalies encountered during a sampling run of the sampling apparatus 200. For example, the x-y-z accelerometer 311A can detect the presence of a dent or protrusion on the inner wall of the pipe 101 as the sampling apparatus 200 travels through the pipe 101 based on a change in acceleration in one or more of the aforementioned directions of acceleration. The sampling apparatus 200 can record the instance of this anomaly in memory 303. The gyroscope sensor 311B is configured to sense angular velocity of the sampling apparatus 200. The measured angular velocity can be used in the traveled distance calculations. In some implementations, the gyroscope sensor 311B is mounted within the sampling apparatus 200 parallel to the longitudinal axis of the sampling apparatus 200, so that the gyroscope sensor 311B produces a proportional output to a change in rotation angle with the sampling apparatus 200.

In some implementations, the computer 300A is communicatively coupled to one or more of the odometer wheels 205. The computer 300A can determine a relative location of the apparatus 200 within the pipe 101 based on data received from one or more of the odometer wheels 205 and the inertia sensor 311. For example, the computer 300A can determine an axial position of the apparatus 200 in relation to the longitudinal length of the pipe 101, a relative elevation of the apparatus 200 within the pipe 101 in relation to a reference elevation at the entrance point of the apparatus 200 into the pipe 101, and orientation of the apparatus 200 in relation to the circumference of the pipe 101.

The computer 300A can determine which of the fluid sampling conduits 240 to use to obtain a fluid sample and which of the vacuum capsules 223 to use to obtain a solid sample based on one or more factors such as location of the apparatus 200 within the pipe 101. The computer 300A can use the data from the odometer wheel(s) 205 and the inertia sensor 311 to make such determinations. For example, while the apparatus 200 travels through the pipe 101, a given fluid sampling conduit 240 designated as #1 is determined to be at the 12:00 position with regards to the circumference of the cylindrical housing 201C at reference distance 0 kilometers given by one of the odometer wheels 205. Once the apparatus 200 has traveled 10 kilometers through the pipe 101 (measured by the same odometer wheel 205), the same fluid sampling conduit 240 (#1) is determined to be at the 3:00 position with regards to the circumference of the cylindrical housing 201C based on the inertia sensor 311. If, for example, a user desires to collect fluid samples only at the 12:00 position, then the #1 fluid sampling conduit 240 can be used at distance 0 kilometers, while a different fluid sampling conduit 240 (that has been determined to be at the 12:00 position at distance 10 kilometers) is used at distance 10 kilometers.

In some implementations, the control system 300 includes a reference vacuum capsule 320 and a differential pressure sensor 321. The reference vacuum capsule 320 has a known internal pressure (less than atmospheric pressure). The differential pressure sensor 321 measures the pressure differential between the fluid in the pipe 101 and the internal pressure of the reference vacuum capsule, and the pressure within the pipe 101 can be determined based on the measured pressure differential and the known internal pressure of the reference vacuum capsule 320. In some implementations, one of the vacuum capsules 223 serves as a reference vacuum capsule.

In some implementations, the control system 300 includes a servomotor 360. The servomotor 360 can be, for example, a telescopic servomotor. The servomotor 360 is configured to extend a length of a telescopic collection conduit. The length of the telescopic collection conduit is extended to perform collection of fluid away from the main body of the sampling apparatus 200. For example, the telescopic collection conduit can be extended to protrude from the sampling apparatus 200 and fluid can enter the extended telescopic collection conduit and then flow to one of the fluid sampling conduits 240. By collecting fluid away from the main body of the sampling apparatus 200, turbulence can be avoided. Fluid turbulence can be caused by the sampling apparatus 200 traveling through the pipe 101 and can interfere with fluid or solid sampling. By using the servomotor 360, a representative sample (which more accurately represents the bulk fluid in the pipe 101) can be obtained from within the pipe 101. If fluid samples were to be obtained in the vicinity of one of the elastomeric rings 207A or 207B which collect contaminants as the sampling apparatus 200 travels through the pipe 101, the fluid samples obtained may not accurately represent the composition of the fluid in that locale of the pipe 101.

In some implementations, the servomotor 360 includes a threaded rod inserted in the telescopic collection conduit, which is formed by a series of concentric conduits with incrementally smaller diameters. Each of the concentric conduits include a nut that is threaded to the threaded rod. Rotating the threaded rod causes the telescoping mechanism (extending or retracting) of the servomotor 360.

At least a portion of the control system 300 (for example, the electrical components of the control system 300) is disposed within the body 201 of the apparatus 200. In some implementations, the control system 300 includes a controller housing (not shown). In some implementations, the controller housing is coupled to an inner wall of the cylindrical housing 201C. In some implementations, the housing 221 serves as the controller housing. The controller housing can encase, for example, the processor 301, the memory 303, the power supply module 305, and a sealed compartment that contains power and communication ports for wired communication and power charging.

Figure 4:
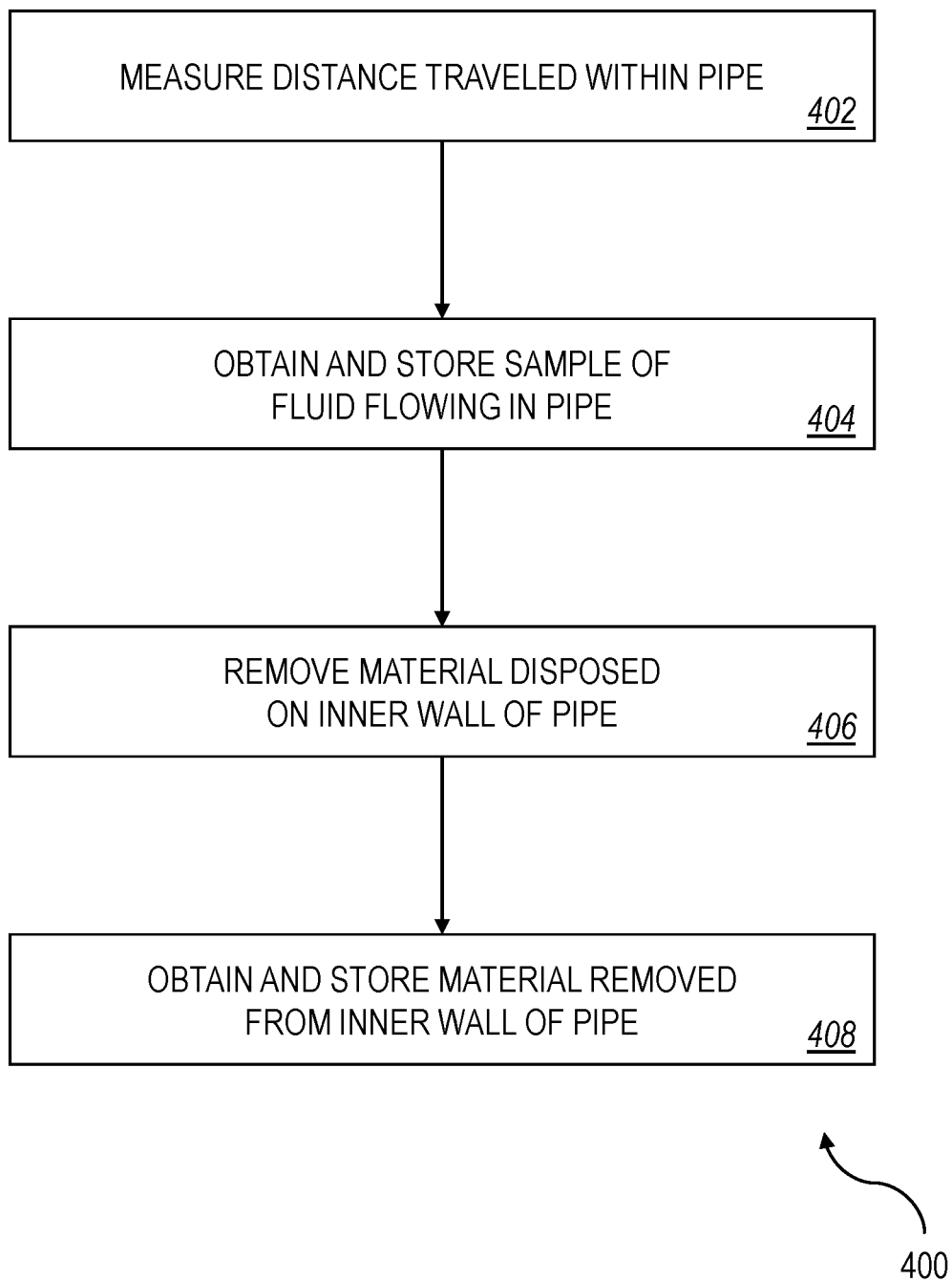
FIG. 4 is a flow chart for an example method for obtaining samples within a pipe.

FIG. 4 is a flow chart for an example method 400 for obtaining samples within a pipe (for example, the pipe 101). The sampling apparatus 200 can be used to implement method 400. The sampling apparatus 200 is disposed within the pipe 101. At step 402, a distance traveled by the apparatus 200 within the pipe is measured. The distance can be measured by one or more of the odometer wheels 205. As the apparatus 200 travels through the pipe 101, the odometer wheel 205, which is in contact with the inner wall of the pipe 101, rotates and measures the distance traveled based on this rotation.

At step 404, a sample of the fluid flowing in the pipe 101 is obtained and stored within the apparatus 200. The fluid sample can be obtained and stored by the fluid sampling conduit 240. In some implementations, the processor 301 transmits an open signal to one of the valves (241) so that fluid flowing in the pipe 101 can enter the fluid sampling conduit 240. After a period of time (for example, after a sufficient volume of fluid has entered the fluid sampling conduit 240), the processor 301 can transmit a close signal to the same valve 241, so that the fluid sample is stored within the fluid sampling conduit 240.

In some implementations, the sampling apparatus 200 includes an analyzer module configured to measure a potential of hydrogen (pH) and detect presence of water and non-oleic contaminants of an obtained fluid sample (for example, a crude oil sample). In response to detecting water in a fluid sample, the control system 300 can determine location(s) at which additional samples are to be obtained in order to inspect for any water-related corrosion deposits. In some implementations, the analyzer module is configured to detect presence of organic and inorganic contaminants. For example, the analyzer module can detect the presence of sulfur-reducing bacteria. In some implementations, an In-Line Inspection (ILI) tool, which comprises a train of instrumented scrapers, takes a series of measurements that reveal various corrosion-related phenomena, such as corrosion deposits at various locations within the pipe 101. The sampling apparatus 200 can be configured to obtain samples (fluid, solid, or both) at the locations identified by the ILI tool.

At step 406, material disposed on the inner wall of the pipe 101 is removed. The material (for example, debris, corrosion/precipitate deposit, or both) can be removed by the elastomeric ring (207A, 207B) that is in contact with the inner wall of the pipe 101 as the apparatus 200 travels through the pipe 101. For example, as the apparatus 200 travels through the pipe 101, the elastomeric ring (207A, 207B), which is in contact with the inner wall of the pipe 101, causes any solid material that may be deposited on the inner wall of the pipe 101 to detach from the inner wall of the pipe 101.

At step 408, at least a portion of the material that was removed from the inner wall of the pipe 101 at step 406 is obtained and stored within the apparatus 200. This portion of material is a solid sample. The solid sample can be obtained and stored by the solid sampling subsystem 220. In some implementations, the processor 301 transmits an open signal to one of the inlet valves 231 so that the material removed from the inner wall of the pipe 101 can flow through the tubing 233 and into the vacuum capsule 223 due to the difference in pressure between the pipe and the vacuum capsule 223. After a period of time, the processor 301 can transmit a close signal to the same valve 231, so that the solid sample is stored within the vacuum capsule 223.

In some implementations, a change in inertia of the apparatus 200 within the pipe 101 is measured. The change in inertia can be measured by the inertia sensor 311. In some implementations, a location of the apparatus 200 within the pipe 101 is determined based on the distance measured at step 402 and the measured change in inertia.

One or more of the steps of method 400 can occur simultaneously. One or more of the steps of method 400 can be repeated. As one example, step 402 can be repeated throughout implementation of method 400 and during any of the other steps of method 400. For example, step 402 is repeated with step 404. For example, step 402 is repeated with step 408. In some implementations, one or more of the steps of method 400 occur at the same location within the pipe 101. In some implementations, one or more of the steps of method 400 occur at different locations within the pipe 101. For example, step 404 and step 408 occur at the same location within the pipe 101. For example, step 404 occurs at a first location within the pipe 101, and step 408 occurs at a second location within the pipe 101 (different from the first location). Furthermore, although described as traveling through the pipe 101, the apparatus 200 can instead remain stationary within the pipe 101 and still be able to perform its fluid sampling and solid sampling functions.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus comprising:
   a body configured to be disposed within a pipe flowing a fluid, wherein the body comprises:
      a first plate;
      a second plate; and
      a cylindrical housing extending from the first plate to the second plate;
   a fluid sampling conduit disposed within the body, the fluid sampling conduit configured to obtain a sample of the fluid flowing in the pipe, wherein the fluid sampling conduit is disposed within the cylindrical housing and extends from the first plate to the second plate, the fluid sampling conduit comprising a first open end at the first plate and a second open end at the second plate;
   an odometer wheel coupled to the body, the odometer wheel configured to measure a distance traveled by the body within the pipe based on rotating while contacting an inner wall of the pipe as the apparatus travels through the pipe, wherein the odometer wheel is coupled to an arm at a coupling point on the arm, the arm coupled to and extending from the body, the odometer wheel configured to rotate about the coupling point;
   an elastomeric ring surrounding at least a portion of the body, the elastomeric ring configured to contact the inner wall of the pipe and remove material disposed on the inner wall of the pipe as the apparatus travels through the pipe; and
   a solid sampling subsystem coupled to and external to the body, the solid sampling subsystem comprising:
      a capsule;
      an inlet valve coupled to the capsule; and
      a tubing coupled to the inlet valve, wherein the inlet valve is configured to, when opened, allow at least a portion of material removed from the inner wall of the pipe by the elastomeric ring to flow through the tubing and into the capsule.

2. The apparatus of claim 1, wherein the solid sampling subsystem comprises:
   a housing coupled to the first plate, the capsule disposed within the housing; and an outlet valve coupled to the capsule, the outlet valve configured to control flow of material out of the capsule.

3. The apparatus of claim 2, wherein the arm comprises a first segment and a second segment connected to each other by a joint configured to allow rotation of the second segment about the joint in relation to the first segment, the first segment coupled to the first plate.

4. The apparatus of claim 3, wherein the elastomeric ring is a first elastomeric ring surrounding a first portion of the cylindrical housing, and the apparatus comprises a second elastomeric ring surrounding a second portion of the cylindrical housing.

5. The apparatus of claim 4, comprising an inertial sensor, the inertial sensor comprising at least one of a gyroscope sensor, an inclinometer, or an x-y-z accelerometer.

6. The apparatus of claim 5, wherein:
the fluid sampling conduit is a first fluid sampling conduit, and
the apparatus comprises a second fluid sampling conduit disposed within the cylindrical housing, the second fluid sampling conduit extending from the first plate to the second plate, the second fluid sampling conduit comprising a first open end at the first plate and a second open end at the second plate.

7. The apparatus of claim 6, wherein:
the odometer wheel is a first odometer wheel,
the arm is a first arm,
the coupling point is a first coupling point,
the apparatus comprises a second odometer wheel coupled to a second arm at a second coupling point, the second arm extending from the first plate, the second odometer wheel configured to rotate freely at the second coupling point with respect to the second arm,
the second arm comprises a first segment and a second segment connected to each other by a joint configured to allow rotation of the second segment of the second arm about the joint of the second arm in relation to the first segment of the second arm, and
the first segment of the second arm is coupled to the first plate.

8. The apparatus of claim 7, wherein:
the capsule is a first capsule,
the outlet valve is a first outlet valve,
the inlet valve is a first inlet valve,
the tubing is a first tubing, and
the apparatus comprises:
a second capsule disposed within the housing, the second capsule having an internal pressure less than atmospheric pressure;
a second outlet valve coupled to the second capsule, the second outlet valve configured to control flow of material out of the second capsule;
a second inlet valve coupled to the second capsule, the second inlet valve configured to control flow of material into the second capsule; and
a second tubing disposed along the second arm, at least one end of the second tubing coupled to the second inlet valve.

9. A method of using the apparatus of claim 1, the method comprising:
measuring, by the odometer of the apparatus disposed within a pipe, a distance traveled by the body within the pipe;
obtaining and storing, by the fluid sampling conduit of the apparatus, a sample of fluid flowing in the pipe;
removing, by the elastomeric ring of the apparatus, material disposed on an inner wall of the pipe; and
obtaining and storing, by the capsule of the apparatus, at least a portion of the material removed from the inner wall of the pipe.

10. The method of claim 9, wherein obtaining the sample of fluid occurs at a first location along the pipe, and measuring the distance traveled by the body within the pipe is repeated at the first location.

11. The method of claim 10, wherein obtaining the portion of the material removed from the inner wall of the pipe occurs at a second location along the pipe, and measuring the distance traveled by the body within the pipe is repeated at the second location.

12. The method of claim 11, comprising:
measuring, by an inertial sensor of the apparatus, a change in inertia of the apparatus within the pipe; and
determining a location of the body within the pipe based on the measured distance and the measured change in inertia.

13. A system comprising:
a pipe configured to flow a fluid; and
an apparatus configured to be disposed within the pipe, the apparatus comprising:
a body;
a plurality of fluid sampling conduits disposed within the body, each fluid sampling conduit configured to obtain a sample of the fluid flowing within the pipe;
a plurality of odometer subsystems, each odometer subsystem comprising:
an arm extending from the body; and
an odometer wheel coupled to the arm at a coupling point, the odometer wheel configured to rotate freely at the coupling point with respect to the arm, the odometer wheel configured to contact an inner wall of the pipe and, while contacting the inner wall of the pipe and rotating about the coupling point as the apparatus travels through the pipe, measure a distance traveled by the body within the pipe;
an elastomeric ring surrounding at least a portion of the body, the elastomeric ring configured to contact the inner wall of the pipe and remove material disposed on the inner wall of the pipe as the apparatus travels through the pipe; and
a plurality of solid sampling subsystems coupled to and external to the body, each solid sampling subsystem comprising:
a capsule;
an inlet valve coupled to the capsule; and
a tubing coupled to the inlet valve, wherein the inlet valve is configured to, when opened, allow at least a portion of material removed from the inner wall of the pipe by the elastomeric ring to flow through the tubing and into the capsule, wherein each tubing is disposed along a different one of the arms of the plurality of odometer subsystems.

14. The system of claim 13, wherein the body comprises:
a first plate;
a second plate; and
a cylindrical housing extending from the first plate to the second plate, wherein the plurality of fluid sampling conduits is disposed within the cylindrical housing, each fluid sampling conduit extends from the first plate to the second plate, and each fluid sampling conduit comprises a first open end at the first plate and a second open end at the second plate.

15. The system of claim 14, comprising a housing external to the body and coupled to the first plate, wherein each capsule of the plurality of solid sampling subsystems is disposed within the housing, and each solid sampling subsystem comprises an outlet valve coupled to the respective capsule, the outlet valve configured to control flow of material out of the respective capsule.

16. The system of claim 15, wherein each arm of the plurality of odometer subsystems comprises a first segment and a second segment connected to each other by a joint configured to allow rotation of the second segment about the joint in relation to the first segment, and the first segment is coupled to the first plate.

17. The system of claim 16, wherein the elastomeric ring is a first elastomeric ring surrounding a first portion of the cylindrical housing, and the apparatus comprises a second elastomeric ring surrounding a second portion of the cylindrical housing.

18. The system of claim 17, wherein the apparatus comprises an inertial sensor, the inertial sensor comprising at least one of a gyroscope sensor, an inclinometer, or an x-y-z accelerometer.

19. The system of claim 18, wherein the apparatus comprises a computer disposed within the cylindrical housing, the computer is communicatively coupled to each odometer subsystem, each fluid sampling subsystem, each solid sampling subsystem, and the inertial sensor, and the computer comprises:
 a processor; and
 a computer-readable medium interoperably coupled to the processor and storing instructions executable by the processor to perform operations comprising:
  receiving distance data from at least one of the odometer subsystems;
  receiving inertia data from the inertial sensor;
  transmitting a first open signal to at least one of the fluid sampling subsystems, thereby allowing fluid flowing in the pipe to flow into the respective fluid sampling subsystem;
  transmitting a first close signal to the fluid sampling subsystem to which the first open signal was transmitted, thereby ceasing fluid flow from the pipe to the respective fluid sampling subsystem and storing a portion of the fluid flow from the pipe within the respective fluid sampling subsystem;
  transmitting a second open signal to the inlet valve of at least one of the solid sampling subsystems, thereby allowing at least a portion of material removed from the inner wall of the pipe by the elastomeric ring to flow through the respective tubing and into the respective capsule;
  transmitting a second close signal to the inlet valve to which the second open signal was transmitted, thereby ceasing flow of material from the pipe to the respective capsule and storing the portion of material within the respective capsule; and
  determining a location of the apparatus within the pipe based on the received distance data and the received inertia data.

* * * * *